Nov. 29, 1955  W. D. HIRSCHKORN  2,724,940
VINE SPLITTER AND DRIVE MEANS THEREFOR
Filed Aug. 10, 1953  2 Sheets-Sheet 1

INVENTOR
*Wm. D. Hirschkorn*
BY *Webster & Webster*
ATTORNEYS

Nov. 29, 1955  W. D. HIRSCHKORN  2,724,940
VINE SPLITTER AND DRIVE MEANS THEREFOR
Filed Aug. 10, 1953  2 Sheets-Sheet 2
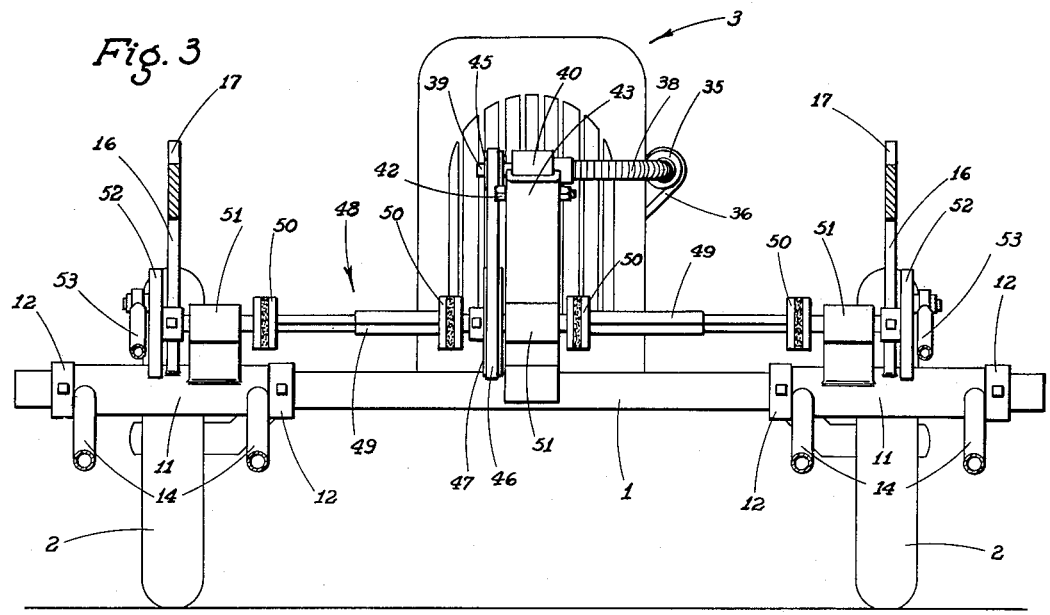
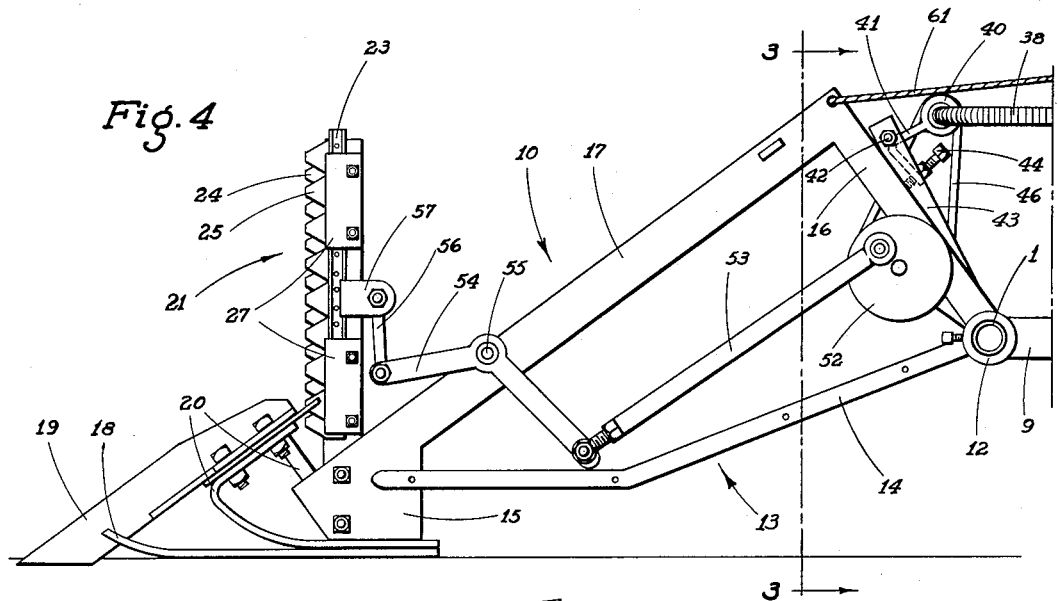
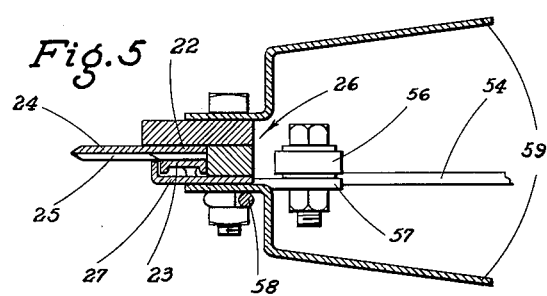
INVENTOR
Wm. D. Hirschkorn
BY
Webster & Webster
ATTORNEYS

2,724,940
VINE SPLITTER AND DRIVE MEANS THEREFOR

William D. Hirschkorn, Livingston, Calif.

Application August 10, 1953, Serial No. 373,087

4 Claims. (Cl. 56—25)

This invention is directed to, and it is a major object to provide, an improved vine splitter; the unit being especially adapted—but not limited—for use with row grown bean crops whose vines grow very rank and entangle between the rows.

Another important object of the invention is to provide a tractor mounted vine splitter which runs ahead of the front wheels of the tractor and is operative to cut and split the entangled vines—of row crops—between the rows thereof, whereby to permit of forward travel of the front wheels of the tractor between the rows, and the effective cutting of the crop, without such vines entangling with the tractor wheels or the vine cutting mechanisms on the tractor which work along the crop rows conventionally rearwardly of said front wheels.

An additional object of the present invention is to provide a tractor mounted vine splitter wherein each unit thereof, of which there may be two or more, comprises a forwardly projecting, floating, push frame having an upstanding cutter or sickle bar unit, of novel construction and function, at the forward end thereof.

A further object of the invention is to provide a novel sickle bar unit drive mechanism; the tractor including a belt driven generator, and said drive mechanism being actuated from the same.

It is also an object of the invention to provide a vine splitter which is designed for ease and economy of manufacture, and for ready and convenient attachment to a conventional wheel type tractor.

Still another object of the invention is to provide a practical, reliable, and durable vine splitter, and on which will be exceedingly effective for the purpose for which it is designed.

These objects are accomplished by means of such structure and relative arrangement of parts as will fully appear by a perusal of the following specification and claims.

In the drawings:

Fig. 3 is transverse sectional elevation taken on line 3—3 of Fig. 4; the view showing particularly the mount, and the adjacent portions of the drive mechanism, for the vine splitting units.

Fig. 4 is a view similar to Fig. 1, but with the vine deflector hood and shield removed.

Fig. 5 is a fragmentary enlarged plan view on line 5—5 of Fig. 1.

Figure 1:
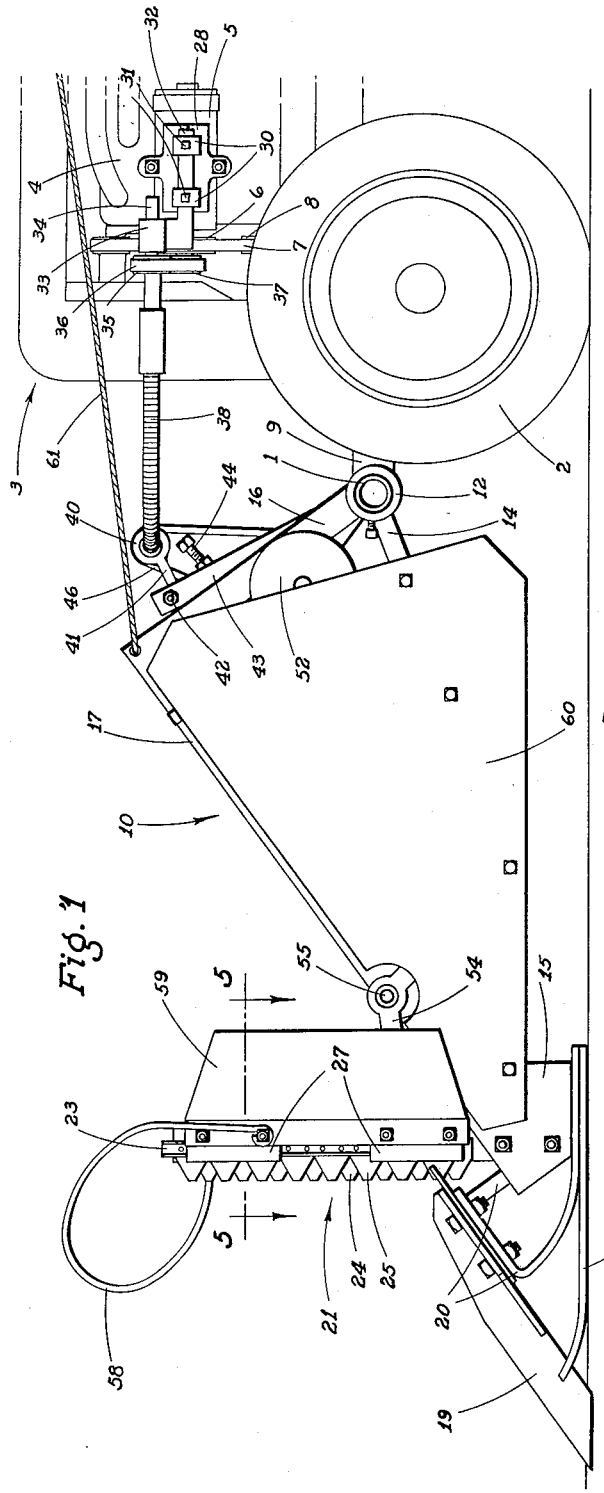
Fig. 1 is a side elevation of the vine splitter as mounted in connection with a wheel type tractor; the view showing mainly the near vine splitting unit.
Figure 2:
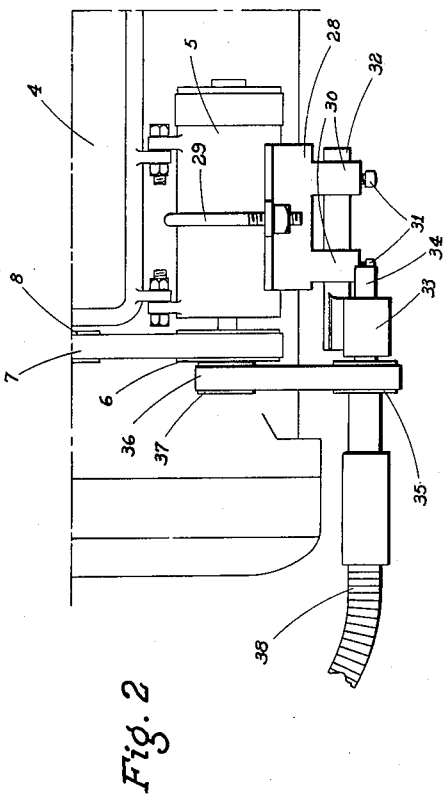
Fig. 2 is a fragmentary plan view of the drive mechanism; the view showing particularly the connection with the tractor generator.

Referring now more particularly to the drawings and to the characters of reference marked thereon, the implement comprises a horizontal, transverse mounting bar 1—which is tubular—disposed ahead of, and spanning between, the front wheels 2 of a wheel type tractor, indicated generally at 3; such tractor including, alongside the engine 4, a generator 5 having a pulley 6 driven by an endless belt 7 from the engine pulley 8. The belt driven generator assembly, as above, provides the power source for the vine splitter, as will hereinafter appear.

The transverse mounting bar 1 is fixed in connection with the frame of tractor 3 by transversely spaced, forwardly projecting the mounting arms 9.

The implement includes, in connection with the mounting bar 1, and in push relation ahead of each of the front wheels 2, a vine splitting unit, indicated generally at 10.

As said vine splitting units are identical—except for being right and left hand—only one is shown in full, and which is constructed as follows:

Ahead of the related front wheel 2 the transverse mounting bar 1 is fitted with a turnable sleeve 11 axially adjustably maintained in position by stop collars 12 on the bar at opposite ends of said sleeve.

A floating push frame, indicated generally at 13, is fixed in connection with and projects ahead of the sleeve 11; such push frame including longitudinal, transversely spaced bottom bars 14 which extend from the sleeve 11 to connection with a vertical foot plate 15.

A centrally disposed back bar 16 upstands from the sleeve 11 at a forward and upward inclination; such back bar merging at its upper end with the rear end of a central top bar 17 which extends at a forward and downward incline merging at its lower end with said foot plate 15.

The floating push frame 13, constructed as above, is supported—at its forward lower end, for motion along the ground—by a sled-type runner 18 secured to the bottom of the foot plate 15; there being an upwardly and rearwardly inclined lifter blade 19 associated with the runner 18, being supported by bracket arms 20. The forward lower end of the lifter blade 19 runs slightly below ground at a point ahead of the front end of the runner 18; the rear upper end of said lifter blade 19 terminating in substantially the vertical transverse plane of the forward portion of the foot plate 15.

A cutter or sickle bar unit 21 is secured to, and upstands from, the foot plate 15; said sickle bar unit 21 comprising a pair of cooperating cutter bars 22 and 23 having forwardly projecting teeth 24 and 25. The cutter bar 22 is stationary, while the cutter bar 23 is vertically reciprocable; such assembly of cutter bars being maintained in an upstanding guide assembly, indicated generally at 26, which includes vertically spaced retention and guide plates 27 for the reciprocable cutter bar 23.

The reciprocable cutter bar 23 is actuated from the generator 5 of the tractor 3 by means of the following mechanism:

The generator 5 is engaged on the outside by a saddle bracket 28 secured in place by a U-bolt 29 which surrounds the generator; the saddle bracket 28 having spaced, outwardly projecting ears 30 in which is turnably adjustably secured, by screws 31, a horizontal, longitudinally extending spindle 32.

At its forward end the spindle 32 is fitted with a laterally outwardly offset bearing 33 which carries a longitudinal counter-shaft 34 fitted with a pulley 35. The pulley 35 is driven by an endless belt 36 from an attachment pulley 37 secured in connection with the generator pulley 6.

A flexible drive shaft 38 connects at one end to the counter-shaft 34, and thence extends forwardly, turning in front of the tractor and coupling in driving relation with a transverse, horizontal stub shaft 39 carried in a bearing 40 on one end of a bellcrank-shaped belt tightening lever 41 pivoted, intermediate its ends—as at 42—on the upper end of a post 43 fixed to and upstanding centrally from the mounting bar 1. The belt tightening lever 41 includes an adjustment screw 44 which bears against the post 43.

The stub shaft 39 carries a pulley 45 which drives an endless belt 46, which turns about a pulley 47 on a double-ended cross shaft, indicated generally at 48; the latter being adjacent and parallel to mounting bar 1, journaled on the post 43 as shown, and includes oppositely projecting telescopic shaft sections 49 having universal couplings 50 therein. Thus, one of the telescopic shaft sections 49 projects from pulley 47 in the direction of each of the vine splitting units 10.

Adjacent but short of the outer end thereof each telescopic shaft section 49 is supported from the near sleeve 11 by a bearing 51, and a pitman 52 is fixed on said shaft section 49 outwardly of said bearing.

A pitman rod 53 pivotally connects between the pitman 52 and the rear end of an inverted bellcrank lever 54 pivoted intermediate its ends, as at 55, to the corresponding top bar 17.

At the forward end thereof the bellcrank lever 54 is pivotally connected to a link 56 which extends upward to pivotal connection with an attachment ear 57 secured to the related reciprocable cutter bar 23 intermediate the guide plates 27.

With the foregoing drive mechanism it will be recognized that each vine splitting unit 10 is effectively, continuously, and positively driven from the generator 5 of the tractor 3; thus eliminating the necessity of a separate power take-off attachment on such tractor.

Each upstanding sickle bar unit is fitted at the top with a vine deflector loop 58 formed of metallic rod; the ends of such loop being secured to the sickle bar unit as shown, and the loop extending mainly forwardly with a slight upward inclination.

Additionally, each upstanding sickle bar unit 21 is fitted, at the back side, with an upstanding shield 59 comprised of rearwardly diverging plates.

The floating push frame 13 of each vine splitting unit 10 is enclosed in the major portion thereof by a hood 60 which comprises downwardly diverging plates; such hood being secured to the push frame by suitable means.

When the above described implement is in use each vine splitting unit 10 runs between crop rows, leading the corresponding front wheel 2 of the tractor.

The entangled vines between such rows are first picked up—as the tractor advances—by the lifter blade 19, and such vines are then engaged, cut, and split by the sickle bar unit 21; the loop 58 preventing the vines from tumbling over the top of said unit 21.

As the tractor continues to advance, the cut and split vines are engaged and deflected laterally by the divergent plates which comprise the shield 59 and hood 60; the vines, in effect, being windrowed aside so that they do not thereafter entangle with the corresponding front wheel 2, or the related trailing tractor-mounted mechanism (not shown) which cuts the vines from the roots along the corresponding row.

For transport or making turns at the ends of the rows, each vine splitting unit 10 is swung upwardly about the mounting bar 1 as an axis; this being accomplished by a pull cable 61 connected between the top of each floating push frame 13, and a power device (not shown) rearwardly on the tractor.

As the turnable sleeves 11 are adjustable axially on the mounting bar 1, and as the shaft sections 49 are telescopic, the vine splitting units 10 can be set to run in alinement ahead of the corresponding front wheels 2, or set to such other position as the spacing of the crop rows may require.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. Means to drive the reciprocating cutter bar of a vine-splitting sickle-bar unit which includes a forwardly projecting tractor-mounted push frame on which the unit is mounted in forwardly facing upstanding relation; said drive means comprising a bellcrank pivoted on the frame transversely of the unit at a point rearwardly of the unit and below the top of the same, one leg of the bellcrank being substantially horizontal, means operatively connecting said leg and the cutter bar intermediate the ends thereof, a driven shaft mounted on the push frame parallel to the axis of the bellcrank and rearwardly thereof, and a pitman rod extending between the other leg of the bellcrank and the shaft in crank relation thereto.

2. In the combination of an implement having a driven shaft and a tractor having a drive shaft adjacent one end, means pivotally connecting the implement on the tractor at said end for vertical swinging movement, and a driving connection between the shafts arranged to function irrespective of the swung position of the implement; the drive shaft extending lengthwise of the tractor with its forward end exposed, and the driven shaft extending transversely of the tractor adjacent the same and with one end spaced laterally of the drive shaft; said driving connection comprising a flexible shaft extending between and connected to said ends of the drive and driven shafts.

3. In the combination of a tractor having a longitudinally extending engine driven shaft adjacent its forward end and disposed laterally inward of the radiator of the tractor, and an implement connected to the tractor and having an implement drive shaft at its end nearest the tractor; means to connect said engine driven shaft with the implement shaft comprising a stub shaft disposed laterally out from the radiator of the tractor and parallel to said engine driven shaft, means mounting the stub shaft on the tractor in fixed relation to said engine driven shaft, a drive connection between the last named shafts, and a flexible power transmitting shaft extending between and connecting the stub shaft at one end and the implement shaft at one end thereof.

4. Mounting and drive means for a tractor-mounted vine splitter including a transverse bar secured to the tractor in front of the same, a pair of vine-splititng units projecting ahead of the bar and including sleeves independently turnably mounted on the bar adjacent the ends thereof and sickle bars at the forward end of the units; a transverse shaft unit normally parallel to the bar adjacent the same, bearings for the shaft unit fixed on the sleeve, a central bearing for the shaft unit fixed on the bar, means to drive the shaft unit adjacent the central bearing from the tractor, and means to drive the sickle bars from the shaft units adjacent the sleeve bearings; the shaft unit between the central bearing and each sleeve bearing comprising a telescoping section and universal joints adjacent the opposite ends of the section.

References Cited in the file of this patent

UNITED STATES PATENTS

| | | |
|---|---|---|
| 721,064 | Monroe | Feb. 17, 1903 |
| 1,301,829 | Foutz | Apr. 29, 1919 |
| 1,656,078 | Sheets | Jan. 10, 1928 |
| 2,161,357 | Kaplan | June 6, 1939 |
| 2,320,317 | Wilson | May 25, 1943 |
| 2,462,967 | Hirschkorn | Mar. 1, 1949 |
| 2,603,052 | Pelham | July 1, 1952 |